United States Patent [19]

McCoy

[11] Patent Number: 4,649,978
[45] Date of Patent: Mar. 17, 1987

[54] WHEEL RING DRIVER

[75] Inventor: Gregory A. McCoy, Bristol, Va.

[73] Assignee: Ingersoll-Rand Company, Woodcliff Lake, N.J.

[21] Appl. No.: 689,283

[22] Filed: Jan. 7, 1985

[51] Int. Cl.$^4$ ............................................. B60B 25/18
[52] U.S. Cl. ............................... 152/410; 301/11 CD; 301/35 SS
[58] Field of Search .............. 152/406, 408, 409, 410, 152/413; 301/11 CD, 35 SS

[56] References Cited

U.S. PATENT DOCUMENTS

| | | | |
|---|---|---|---|
| 2,380,649 | 7/1945 | Hollerith | 152/406 |
| 3,529,869 | 9/1970 | Casey | 152/409 X |
| 3,599,698 | 8/1971 | Skehan et al. | 152/410 |

FOREIGN PATENT DOCUMENTS 575161  4/1933  Fed. Rep. of Germany ...... 152/410

Primary Examiner—David A. Scherbel
Attorney, Agent, or Firm—R. J. Falkowski

[57] ABSTRACT

A vehicle is supported by wheel and tire assemblies. The assemblies each have a tire mounted around a cylindrical wheel rim and retained in place by an annular retaining ring that abuts the wheel rim and the tire. A lock ring is located in an annular groove in the wheel rim and abuts the retaining ring to hold the retaining ring in place against the tire. A tension plate is connected to the retaining ring through a set of tap screws to hold the tension plate against the end of the wheel rim and thereby retain the annular ring and the tire against rotation around the rim.

11 Claims, 3 Drawing Figures

U.S. Patent  Mar. 17, 1987  4,649,978
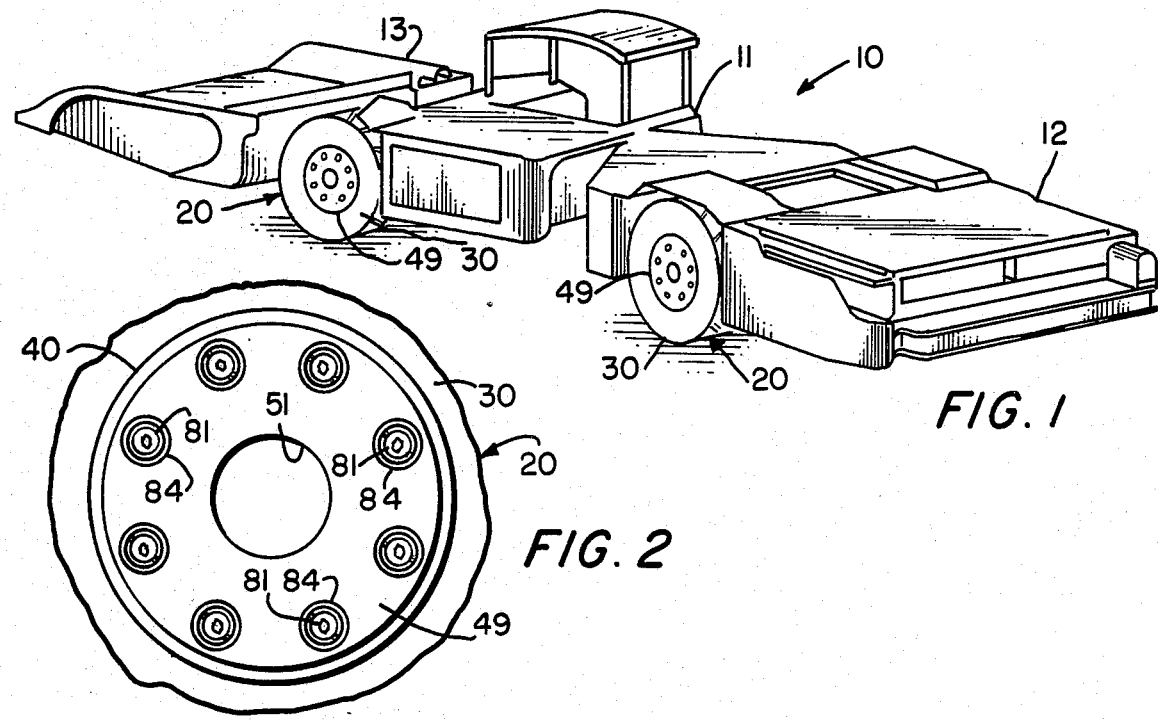
FIG. 1
FIG. 2
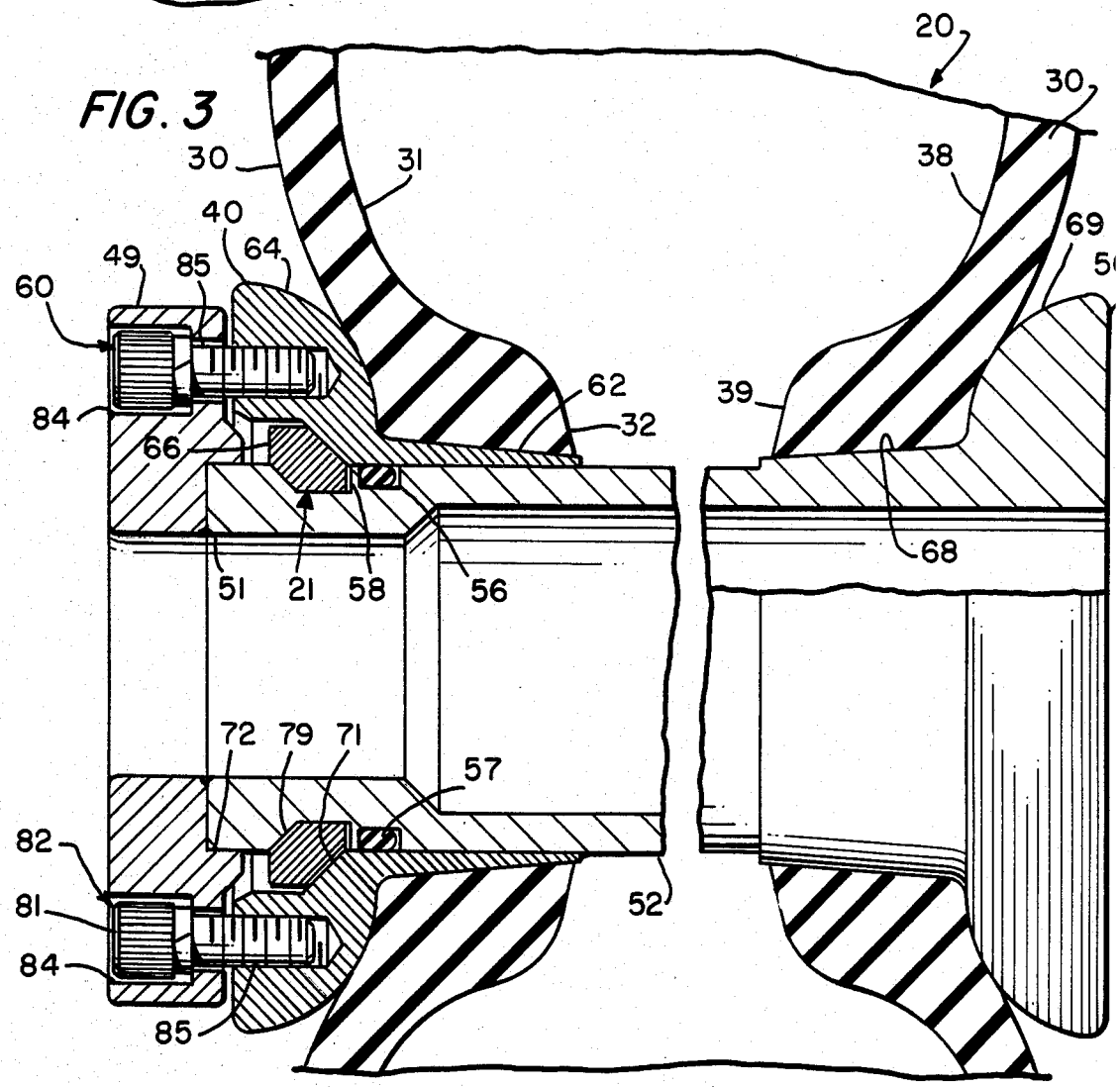
FIG. 3

WHEEL RING DRIVER

This invention relates to wheel and tire assemblies for vehicles, particularly to wheel and tire assemblies used in high torque applications.

In mining and similar vehicles having low speed and high torque requirements a major problem is the rotation of the tires about the wheel rims when moving under heavy load conditions. Various devices have been tried to prevent such rotation but these have been found to be generally unacceptable either because of poor performance or high expense.

With this invention a simple, effective retaining mechanism for a tire in such an application is provided.

FIG. 1 is a drawing of a typical mining vehicle supported by wheel and tire assemblies according to this invention; and FIG. 2 is a partial end view of a wheel and tire assembly shown in FIG. 1;

FIG. 3 is a partial cross-section of a wheel and tire assembly shown in FIG. 1.

Referring to FIG. 1, a mining vehicle 10 of any known type has a main body 11, a battery section 12, a scoop section 13, a means for driving the wheels (not shown) of any known type, and wheel and tire assemblies 20 each having a tire 30 and a tension plate 49. The vehicle is a type that typically moves over difficult terrain, such as in a mine, under heavy load conditions and often requires significant torque to move under normal operating conditions.

Referring to FIGS. 2 and 3, wheel and tire assembly 20 has a cylindrical wheel rim 50; tire 30 mounted on the rim and having an outer side wall 31 with a base section 32 and an inner side wall 38 with a base section 39; an annular retaining ring 40; a means 21 for maintaining the retaining ring in abutment with the outer side wall of the tire; tension plate 49 axially adjacent an axial outer end or section 51 of the wheel rim; and a means 60 for holding the tension plate to the retaining ring in tension.

Wheel rim 50 is of any known type connected in any known way to an axle (not shown) and has an outer radial portion 52, axial outward end portion 51, an "O" ring groove 56, and an annular locking ring groove 58.

Annular retaining ring 40 is adjacent outer side wall 31 of the tire and substantially surrounds the rim in any known manner to engage the tire and the rim. It has a cylindrically tapered section 62 extending between base section 32 of tire and the outer radial section 52 of the rim and an integral radially outwardly extending section 64 abutting outer side wall 31 of the tire. An "O" ring 57 in annular groove 56 in the wheel rim and provides an air seal between the retaining ring and the rim. The rim has an internal retaining lip 69 engaging inner side wall 38 of the tire and a ramp portion 68 abutting base section 39 of the tire.

Means 21 for maintaining the retaining ring in abutment to the outer wall of the tire includes annular lock groove 58 in the wheel rim which is positioned outwardly of the outer side wall of the tire and an annular lock ring 66 positioned within annular groove 58 around the wheel rim. Groove 58 and lock ring 66 have an inclined plane abutment 79 and are positioned adjacent to retaining ring 40 and in position to maintain the retaining ring in abutment with the tire and in a frictional engagement with the tire to prevent rotation of the tire about the wheel rim. Upon inflation of the tire the air pressure causes inner side wall 38 of the tire to be pressed against retaining lip 69 and outer side wall 31 of the tire to be pressed against retaining ring 40. This forces the retaining ring against lock ring 66 and the retaining ring slides up an inclined plane abutment or ramp surface 71 between the retaining ring and the lock ring adapted to increase the frictional holding capability between retaining ring 41, lock ring 66 and rim 51 assisted by inclined plane abutment 79.

Tension plate 49 is axially adjacent and positioned to abut axial outer end 51 of the wheel rim and has an annular flange section 72 that is adjacent to and seats over outer end 51 of the wheel rim to retain the tension plate in place around the wheel rim.

Means 60 for holding the tension plate to the retaining ring in tension comprises a fastening device 82 connecting the tension plate to annular retaining ring 40. Fastening device 82 comprises a tap screw arrangement having screws 81, tapped holes and seats 84 in tension plate 49 and tap screw holes 85 in retaining ring 40. Several screws are tapped into the retaining ring so that by tightening the screws a selected tension is created between the tension plate and the retaining ring to hold the tension plate at a selected coefficient of friction level against axial outer end 51 of the wheel rim and to further increase the coefficient of friction at inclined plane 71 as the tension is increased. This keeps the retaining ring from rotating and in a locked condition with respect to the rim primarily through retaining ring 40 and lock ring 66. The relatively high coefficient of friction between the retaining ring and the tire keeps the tire from rotating around the retaining ring.

I claim:

1. A wheel and tire assembly for a mining vehicle comprising:
    a wheel rim having an axial outer end;
    a tire mounted on the rim;
    an annular retaining ring extending between the tire and the wheel rim;
    a tension plate abutting the axial outer end of the wheel rim and spaced apart at a selected distance from the retaining ring; and
    a means for holding the tension plate to the retaining ring at a selected tension.

2. An assembly according to claim 1 wherein the means for holding comprises a screw and tap arrangement with a screw connecting the tension plate to the retaining ring.

3. An assembly according to claim 2 also comprising a means for maintaining the retaining ring in abutment with the tire.

4. An assembly according to claim 1 wherein said means for maintaining comprises:
    an annular lock ring groove in the wheel rim; and
    an annular lock ring located in the lock ring groove, said annular lock ring and lock ring groove positioned to maintain the retaining ring in abutment with the outer side wall of the tire and said lock ring and retaining ring having an inclined plane abutment adapted to increase the coefficient of friction between the lock ring and the retaining ring as the selected tension is increased by the means for holding.

5. An assembly according to claim 4 wherein the means for holding comprises tap screws connecting the tension plate to the retaining ring wherein said screws are tightened to place a selected tension between the tension plate and the retaining ring and the lock ring and the retaining ring to maintain the retaining ring in a locked position with respect to the wheel rim.

6. A wheel and tire assembly for a mining vehicle comprising:
   a wheel rim having an axial outer end;
   a tire mounted on the rim and having an outer side wall;
   an annular retaining ring substantially surrounding the rim and extending between the outer side wall of the tire and the wheel rim;
   a tension plate axially adjacent the axial outer end of the wheel rim positioned to abut the axial outer end of the wheel rim; and
   a means for holding the tension plate to the retaining ring in tension between the axial outer end and the retaining ring, said means connected between the tension plate and the retaining ring for holding the tension plate against the axial outer end.

7. An assembly according to claim 6 wherein the means for holding comprises a screw and tap arrangement with screws connecting the tension plate to the retaining ring at a selected tension.

8. An assembly according to claim 6 also comprising an annular lock ring groove in the wheel rim; and
   a lock ring located in the lock ring groove, said annular lock ring and lock ring groove positioned to maintain the retaining ring in abutment with the outer side wall of the tire and said lock ring.

9. An assembly according to claim 6 wherein the means for holding comprises tap screws connecting the tension plate to the retaining ring wherein said screws are tightened to place a selected tension between the tension plate and the retaining ring to maintain the retaining ring at a selected coefficient of friction with respect to the wheel rim and thereby retain the tire in a locked position with respect to the wheel rim.

10. A wheel and tire assembly for mining vehicle comprising:
    a wheel rim having an axial outer end;
    a tire having an outer side wall mounted on the rim;
    an annular retaining ring having a cylindrical tapered section extending between the outer side wall of the tire and the rim and an integral radially outwardly extending section abutting the outer side wall of the tire;
    an annular lock groove in the wheel rim positioned outwardly of the tire;
    an annular lock ring positioned within the annular groove around the wheel rim, said groove and locking ring positioned adjacent the retaining ring and in position to maintain the annular ring in abutment with the tire and on the wheel rim, said lock ring and retaining ring having an inclined plane abutment;
    a tension plate axially adjacent the axial outer end of the wheel rim positioned to abut the axial outer end of the wheel rim; and
    a means for connecting the tension plate to the retaining ring in tension, said means connected between the tension plate and the retaining ring for holding the tension plate against the axial outer end.

11. An assembly according to claim 10 wherein the means for connecting comprises tap screws connecting the tension plate to the retaining ring wherein said screws are tightened to place a selected tension between the tension plate and the axial outer rim of the wheel rim to maintain the retaining ring at a selected coefficient of friction with respect to the wheel rim.

* * * * *